J. F. SHECKLER.
MACHINE FOR MAKING BRICK.
APPLICATION FILED SEPT. 27, 1909.

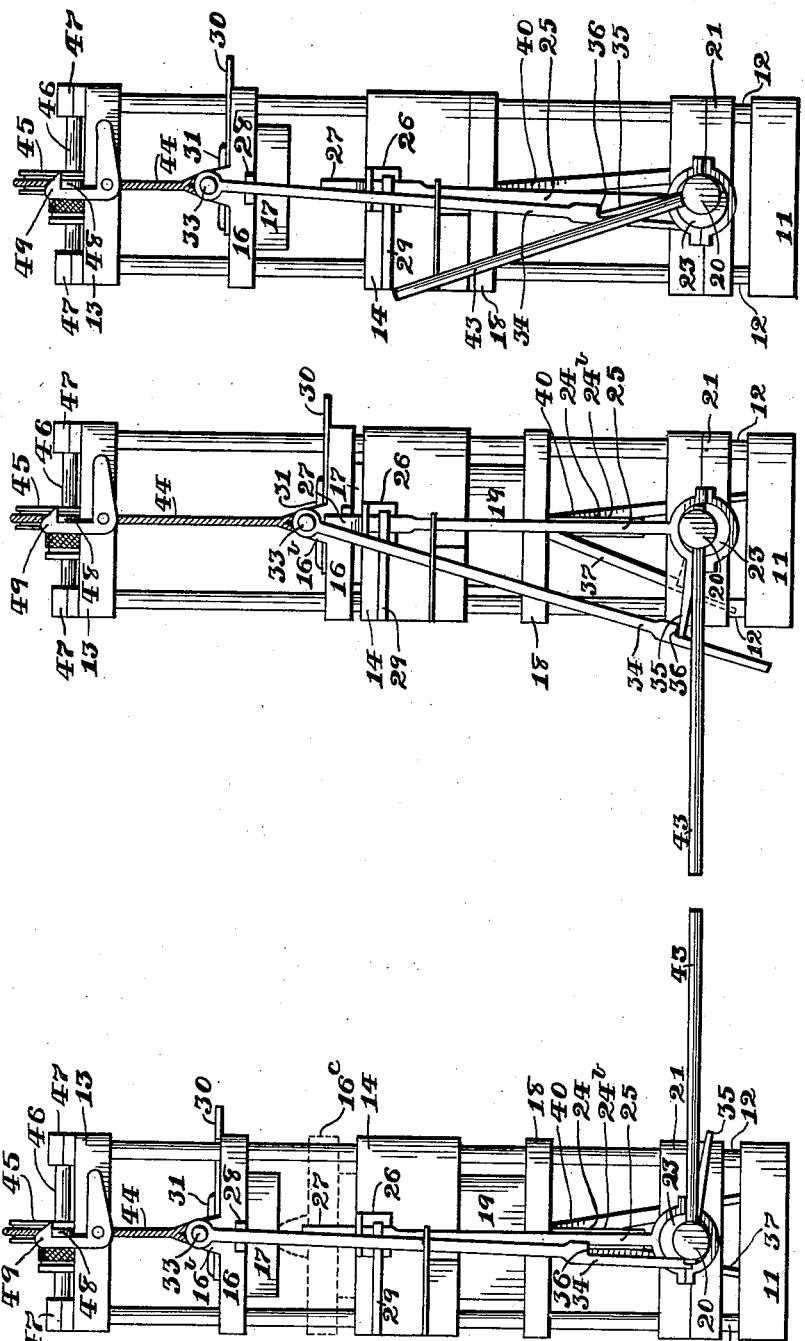

1,017,921.

Patented Feb. 20, 1912.
4 SHEETS—SHEET 2.

Witnesses:
H. C. Adams.
W. R. Chambers.

Inventor:
John F. Sheckler.
By Frank P. Shepard, Att'y.

J. F. SHECKLER.
MACHINE FOR MAKING BRICK.
APPLICATION FILED SEPT. 27, 1909.
1,017,921.
Patented Feb. 20, 1912.
4 SHEETS—SHEET 3.
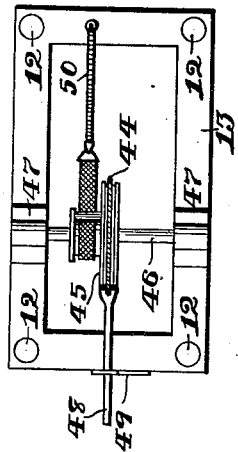
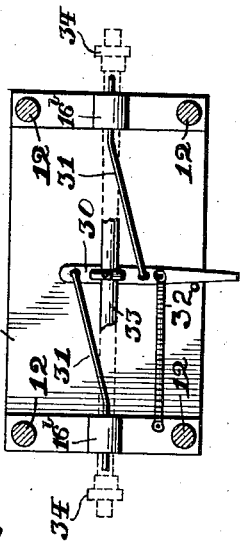
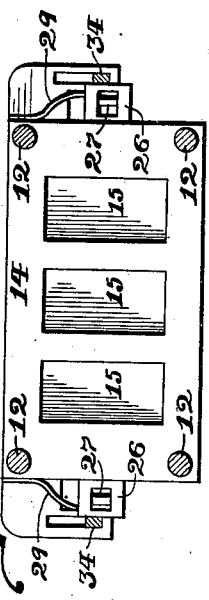
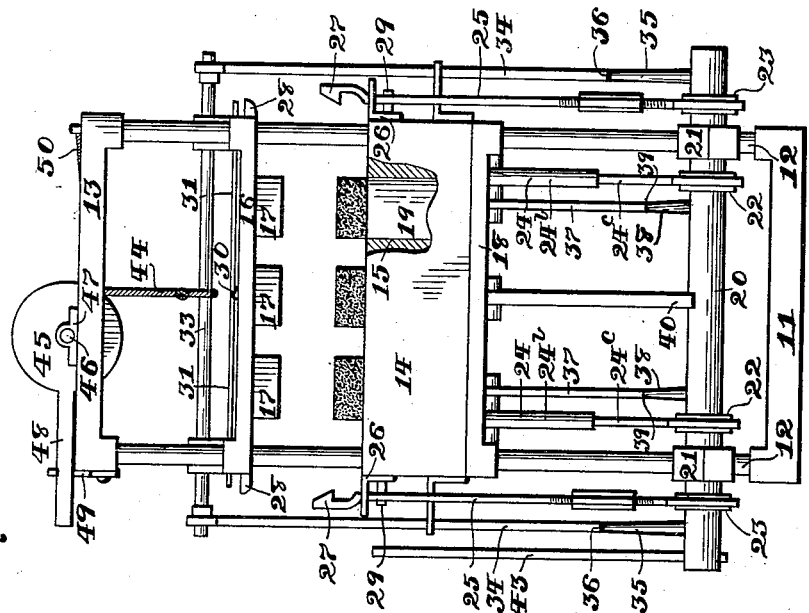
Witnesses:
H. C. Adams
W. R. Chambers
Inventor:
John F. Sheckler.
By Frank P. Shepard, Atty.

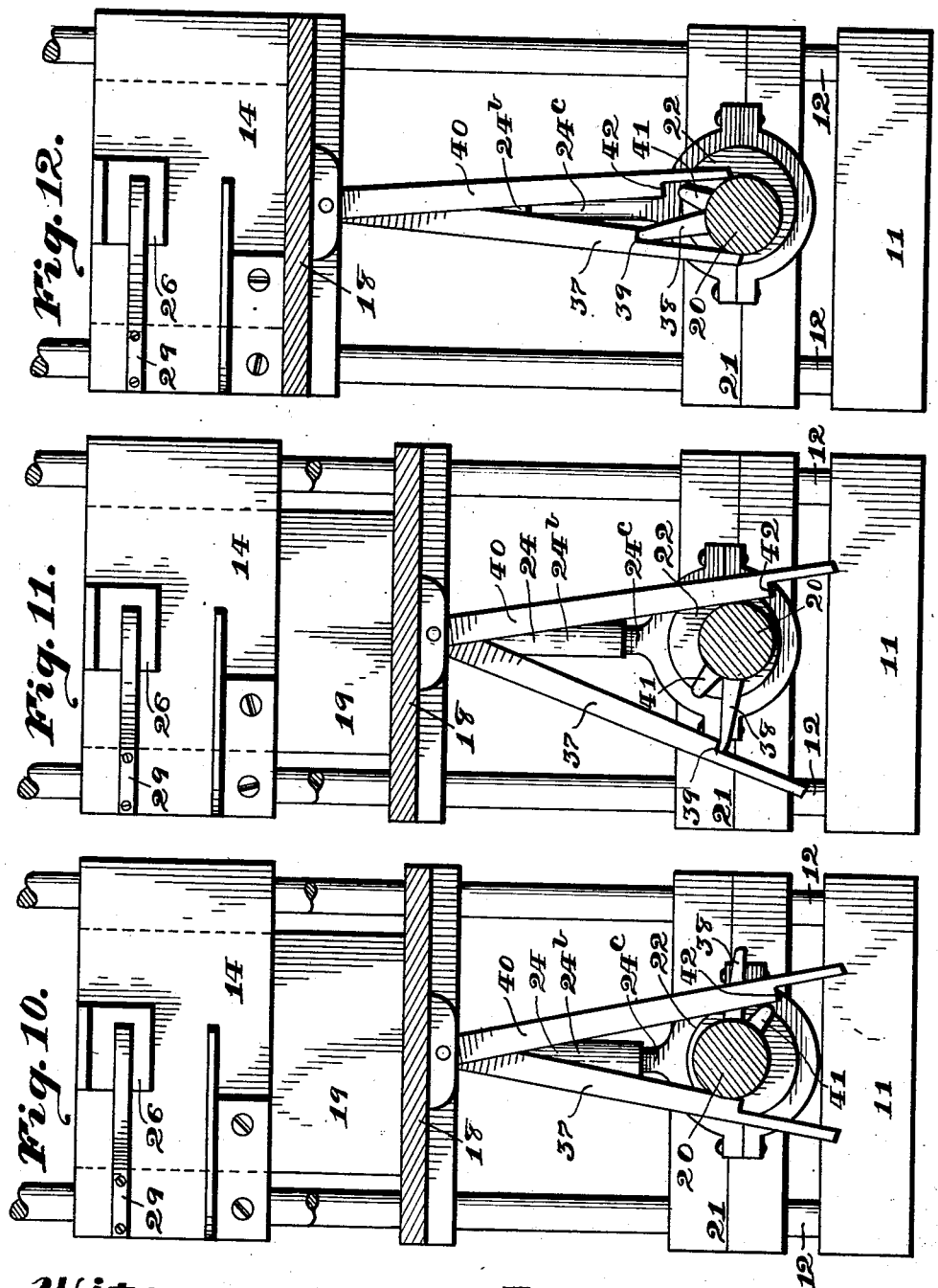

UNITED STATES PATENT OFFICE.

JOHN F. SHECKLER, OF OKLAHOMA, OKLAHOMA.

MACHINE FOR MAKING BRICK.

1,017,921.  Specification of Letters Patent.  Patented Feb. 20, 1912.

Application filed September 27, 1909. Serial No. 519,871.

*To all whom it may concern:*

Be it known that I, JOHN F. SHECKLER, a citizen of the United States, residing at Oklahoma city, in the county of Oklahoma and State of Oklahoma, have invented certain new and useful Improvements in Machines for Making Brick, of which the following is a full, clear, and exact description, reference being had to the annexed drawings.

The object of this invention is to produce a machine of this class which is cheap and simple in construction and which can be more quickly and conveniently operated than other machines of this class heretofore used.

Other objects and advantages of the invention will be set forth in the ensuing description.

Figure 5:
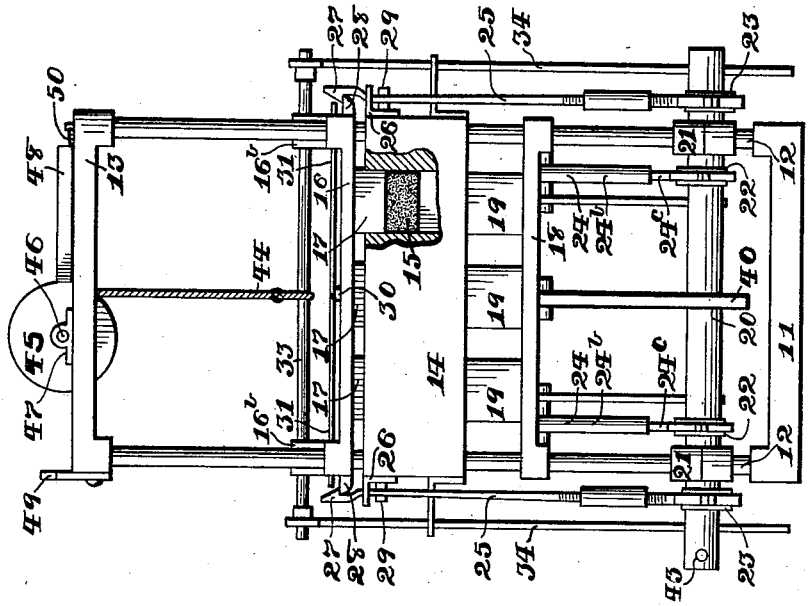
Figure 4:
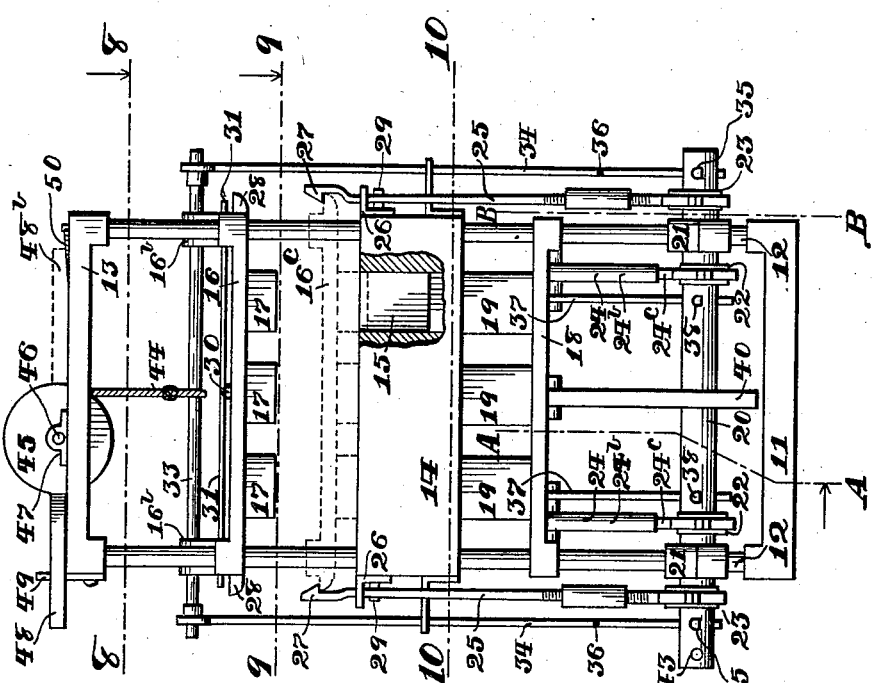

Referring to the annexed drawings: Figure 1 is a side elevation of the complete machine, showing the parts in the position in which they stand for filling certain molds with material for compression. Fig. 2 is a view similar to Fig. 1, but showing the parts in different position. Fig. 3 is a view similar to Figs. 1 and 2, but showing the parts in still another position. Fig. 4 is a front elevation of the machine, showing the parts in the same position as in Fig. 1. Fig. 5 is a front elevation similar to Fig. 4, showing the parts in the same position as in Fig. 2. Fig. 6 is a front elevation similar to Figs. 4 and 5, showing the parts in the same position as in Fig. 3. Fig. 7 is a plan view of the machine, no parts being shown below the line 8—8 of Fig. 4. Fig. 8 is a sectional view taken on the line 8—8 of Fig. 4, no parts being shown below the line 9—9 of said Fig. 4. Fig. 9 is a sectional view taken on the line 9—9 of Fig. 4, no parts being shown below the line 10—10 of said Fig. 4. Fig. 10 is an enlarged sectional view of a portion of the machine, taken on the line A—A of Fig. 4, and showing the parts in the same position as in said Fig. 4 and Fig. 1. Fig. 11 is a sectional view similar to Fig. 10, but showing the parts in the same position as in Figs. 2 and 5. Fig. 12 is a sectional view similar to Fig. 10, but showing the parts in the same position as in Figs. 3 and 6.

Referring to the several figures, in all of which like characters of reference designate like parts, the improved machine is provided with a supporting frame-work composed of a cast-metal base 11; round metal columns 12 which are inserted into the four corners of the base 11; and a cap 13 into which the columns 12 are securely inserted. A cast-metal casing 14 is mounted within the frame-work at about mid height thereof, the columns 12 extending tightly through the corner portions of said casing and supporting it rigidly for the purposes later shown. This casing 14 is divided into compartments or chambers 15 in which the material to form the brick is compressed, there being three such chambers shown in this instance. A flat yoke 16 is mounted above the casing 14 and adapted to move vertically, the columns 12 of the frame-work passing slidably through the corners of said yoke. The lower face of this yoke 16 is provided with three plungers 17 adapted to enter the press-chambers 15 of the casing 14 as said yoke 16 is lowered. A similar yoke 18 is mounted below the casing 14 and adapted to move vertically like the yoke 16, the columns 12 of the frame-work passing slidably through the corners of said yoke 18 in the same manner as through the yoke 16. The upper face of this yoke 18 is provided with three plungers 19 which remain entered within the lower ends of the press-chambers 15 of the casing 14.

A revoluble shaft 20 is journaled laterally through the lower portion of the frame-work in bearings 21 which are supported by the columns 12. This shaft 20 is provided inside the frame-work with two eccentrics 22 which are tightly set in the same rotative position on said shaft. This shaft 20 is also provided on the outside of the frame-work with two similar eccentrics 23 which are set tightly on said shaft in a position diametrically opposite the inner eccentrics 22. The inner eccentrics 22 of the shaft 20 are operatively connected with and adapted to raise the yoke 18 by connecting-rods 24. These connecting-rods 24 each consist of an upper and lower member $24^b$ and $24^c$, respectively, which telescope together, this arrangement allowing the yoke 18 to be forced upward by revolving the shaft 20, while said yoke 18 may afterward be raised independently of said shaft. The outer eccentrics 23 are provided with upwardly-extending connecting-rods 25 whose upper ends pass through guiding lugs 26 secured to the ends of the casing 14, the upper ends of these connecting-rods 25 being formed into downwardly-inclined hooks 27 adapted to engage projecting lugs 28 on the ends of the upper yoke 16. The upper hooked ends of these connecting-rods 25 are yieldably held in position to engage the lugs 28 by leaf springs 29 which are secured to the ends of the casing 14. For releasing the engagement of these connecting-rods 25 with the lugs 28, for purposes later shown, a lever 30 is pivoted centrally of the upper face of the upper yoke 16, two thrust-rods 31 being pivoted to said lever on opposite sides of its fulcrum and passing out slidably through upwardly-projecting integral end portions 16$^b$ of said yoke, as best shown in Fig. 8. By moving this lever 30, these thrust-rods 31 are forced outward and release the engagement of the rods 25, the lever then drawing the thrust-rods back inward in obedience to a tension spring 32. The upper yoke 16 also has a rod 33 extending tightly through its upwardly-projecting end portions 16$^b$, above the thrust-rods 31, and projecting outward at each end. Each end of this rod 33 is provided with a depending connecting-rod 34, so pivoted thereto that its lower end may swing in a fore-and-aft direction in the rear of the shaft 20, and said shaft is provided with radial arms 35 adapted to engage shoulders 36 on said connecting-rods 34 and lift up thereon to lift the yoke 16 as later described. The lower yoke 18 is provided with two depending connecting-rods 37 whose lower ends are adapted to swing in a fore-and-aft direction in the rear of the shaft 20, and said shaft is provided with two radial arms 38 extending in about the same radial direction as the outside arms 35, said arms 38 being adapted to engage the shoulders 39 on said connecting-rods for lifting up said yoke 18 as later described. This lower yoke 18 is provided centrally with one depending connecting-rod 40 whose lower end is adapted to swing in a fore-and-aft direction in front of the shaft 20, and said shaft is provided with a radial arm 41 adapted to be engaged by a shoulder 42 on said connecting-rod and support said yoke for purposes later shown.

In the use of the machine, the parts are brought into the position shown in Figs. 1, 4, and 10. In this position, the shaft 20 stands with its outer eccentrics 23 at the upper part of their stroke, while the inner eccentrics 22 are at the lower part of their strokes, the handle 43 by which said shaft is revolved extending horizontally in the forward direction shown. This position of the parts places the lower yoke 18 at the lower end of its stroke, while at the same instant the upper yoke 16 is supported in its uppermost position by a cord or cable 44 which extends up over and is secured to a pulley 45. This pulley 45 is journaled on a shaft 46 which is in turn journaled in bearings 47 on the cap 13 of the framework, said pulley being provided with a lever or handle 48 which is caught under a pivoted hook 49 on the cap 13 in order to support the yoke 16.

With the parts in the position described, the press-chambers 15 are filled with the plastic material for forming the brick. Then, by releasing the engagement of the hook 49 with the pulley-handle 48, said handle is allowed to swing over into the position indicated by the dotted representations 48$^b$ in Fig. 4, thus allowing the yoke 16 to drop down into the position indicated by the dotted representations 16$^c$ in said figure. With the yoke 16 in this position, its projecting end lugs 28 are caught by the hooks 27 of the connecting-rods 25, and its depending plungers 17 have just entered the press-chambers 15 on top of the charge of material to form the brick. It will be noted that at this instant, and while the handle 43 of the shaft 20 extends horizontally forward in the initial position previously referred to, the single arm 41 of said shaft contacts its connecting-rod 40 above the shoulder 42 thereon, so as not to engage said shoulder during the initial movement of said shaft and arm to the rear. Now, by swinging the handle 43 of the shaft 20 up and over backward 180 degrees into the position shown in Figs. 2 and 5, the lower yoke 18 and its plungers 19 are forced upward by the lifting action of the eccentrics 22 on the connecting-rods 24, while at the same time the upper yoke 16 and its plungers 17 are drawn downward by the outer eccentrics 23 and connecting rods 25; these movements bringing the parts into the position shown in Figs. 2, 5, and 11. It will be noted that at this instant the projecting arms 35 of the shaft 20 have also swung over backward, swinging the lower ends of the connecting-rods 34 backward and dropping under the shoulders 36 thereon; while the radial arms 38 of said shaft 20 have also swung over backward and have dropped under shoulders 39 on the depending connecting-rods 37 of the lower yoke 18. The hooked ends 27 of the connecting rods 25 are then forced out of engagement with the lugs 28 of the upper yoke by suitably manipulating the lever 30. Now, by raising the handle 43 of the shaft 20 back up into the nearly vertical position shown in Figs. 3 and 6, the arms 35 of said shaft rise upward on the connecting-rods of the upper yoke 16 and raise said yoke rapidly upward where its plungers 17 stand high above the press-chambers 15. This upward movement of the yoke 16 allows the pulley 45 to be revolved by the action of a tension spring 50 on its shaft 46 and thus take up the cable 44, the handle 48 of said pulley swinging into locking engagement with the hook 49 in position to support the yoke 16 in its uppermost position. While the upward movement of the upper yoke 16 is being produced by the action of the arms 35 on its connecting-rods 34, the lower yoke 18 is also being raised upward by the lifting action of the aforesaid arms 38 of the shaft 20 on the depending connecting-rods 39, thus lifting said yoke 18 rapidly upward where the upper ends of its plungers 19 will stand flush with the upper ends of the press-chambers 15 or with the upper face of the casing 14. This upward movement of the lower yoke 18 and its plungers 19 raises the pressed and finished brick up where they may be removed from the machine. After removal of the brick, and during the further forward movement of the handle 43, the extreme lower ends of the connecting-rods 34 and 37 are limited in their forward swinging movement by abutting the shaft 20, a further forward movement of said shaft by said handle 43 causing all of the arms 35 and 38 to trip out of lifting engagement with said connecting-rods. This allows the upper yoke 16 to remain supported by the cable 44 in the position shown in Figs. 3 and 6, and at the same instant allows the lower yoke 18 to drop downward until the shoulder 42 on the single connecting-rod 40 of said yoke abuts the end of the single arm 41 of the shaft 20. Then, by bringing the handle 43 of the shaft 20 down forward back into the initial position shown in Figs. 1 and 4, the lower yoke 18 is let slowly downward toward the initial position shown in said figures, the shoulder of the connecting-rod 40 slipping past the arm 41 just before the completed movement of said shaft and arm to initial position. With the parts in this position the machine is ready to be recharged or re-loaded with material for another pressing of brick, and the handle 43 of the shaft 20 lies entirely down forward in the initial position shown in Figs. 1 and 4, preparatory to having the parts again operated as on the previous pressing.

The foregoing being a full, clear, and exact description of the invention, what I claim and desire to secure by Letters Patent is:—

1. A brick machine including a press chamber, a plunger mounted above the press chamber and adapted to enter the same, a second plunger slidable within the press chamber and forming a movable bottom for the same, a shaft, means actuated by the shaft when turned in one direction for drawing the plungers toward each other, means actuated by the shaft during the first half of its return movement for elevating the first plunger above the press and also elevating the second plunger to the top of the press chamber, and means actuated by the shaft during the second half of its return movement for slowly lowering the second plunger to normal position and providing a continuous support for the same during its downward movement.

2. A brick machine including a press chamber, a plunger slidably mounted within the press chamber, a shaft, means actuated by the shaft when turned in one direction for moving the plunger within the press chamber, means actuated by the shaft during the first half of its return movement for moving the plunger to the end of the press chamber to eject any material therein, a connecting rod pivotally connected to the plunger and normally swinging loosely against the shaft, and an arm projecting from the shaft for engagement with the said connecting rod to cause a slow return of the plunger to normal position upon the second half of the return movement of the rock shaft.

3. A brick machine including a press chamber, a plunger mounted within the press chamber, a rock shaft, an operative connection between the rock shaft and the plunger whereby the plunger is moved within the press chamber when the shaft is turned in one direction, a pair of connecting rods hanging loosely from the plunger on opposite sides of the shaft, means upon the shaft for coöperation with one of the connecting rods upon the initial portion of the return movement of the rock shaft for imparting a greater amplitude of movement to the plunger than is given by the cam, and means upon the rock shaft for engaging the opposite connecting rod during the later half of the return movement of the rock shaft to permit of an easy return of the plunger to normal position.

4. A brick machine including a press chamber, a plunger mounted over the press chamber, a second plunger mounted within the press chamber and forming a movable bottom for the same, a rock shaft arranged under the press chamber and formed with oppositely disposed cams, an extensible connecting rod between one of the cams and the second plunger, a connecting rod between the first plunger and the opposite cam whereby the plungers are drawn toward each other when the rock shaft is turned in one direction, a connecting rod hanging loosely from the first plunger on one side of the rock shaft, a second connecting rod hanging loosely from the second plunger on the same side of the rock shaft, a third connecting rod also hanging loosely from the second plunger upon the opposite side of the rock shaft, means upon the rock shaft for engaging the first two hanging connecting rods during the initial movement of the return movement of the rock shaft for lifting the upper plunger above the press chamber and elevating the lower plunger to the top of the press chamber, and means upon the rock shaft for coöperation with the third hanging connecting rod for permitting an easy return of the lower plunger to normal position during the later portion of the return movement of the rock shaft.

5. A brick machine including a press chamber, a plunger mounted within the press chamber, a rock shaft formed with a cam, an extensible connecting rod between the plunger and the cam of the shaft whereby the plunger is moved within the press chamber when the shaft is turned in one direction, a pair of connecting rods hanging loosely from the plunger on opposite sides of the shaft and provided with shoulders, and a pair of arms projecting from the shaft and disposed at an angle to each other, one of the arms engaging the shoulder of one of the connecting rods upon the initial portion of the return movement of the rock shaft so as to impart a greater amplitude thereto than is given by the cam, the opposite arm engaging the shoulder of the opposite connecting rod during the latter half of the return movement of the rock shaft so as to permit of an easy return of the plunger to normal position.

6. A brick machine including a press chamber, a plunger mounted above the press chamber and adapted to enter the same, a second plunger mounted within the press chamber and forming a movable bottom for the same, a rock shaft arranged under the press chamber and formed with oppositely disposed cams, an extensible connecting rod between one of the cams and the second plunger, a connecting rod forming a connection between the first plunger and the opposite cam to admit of the plungers being drawn toward each other when the rock shaft is turned in one direction, a connecting rod hanging loosely from the first plunger upon one side of the rock shaft and provided with a shoulder, a similar connecting rod hanging loosely from the second plunger upon the same side of the rock shaft and also formed with a shoulder, said connecting rods normally hanging loosely against the shaft, and arms projecting from the rock shaft, the said arms engaging the said connecting rods to swing them away from the shaft and drop under the shoulders thereof upon the initial movement of the rock shaft and being adapted to engage the shoulders of the said loosely hanging connecting rods upon the return movement of the rock shaft for lifting the upper plunger above the press chamber and elevating the lower plunger to the top of the press chamber.

7. A brick machine including a press chamber, a plunger mounted within the press chamber and adapted to enter the same, a second plunger slidably mounted within the press chamber and forming a movable bottom for the same, a rock shaft arranged under the press chamber and formed with oppositely disposed cams, an extensible connecting rod between one of the cams and the second plunger, a connecting rod engaging the opposite cam and also detachably engaging the first plunger, means carried by the first plunger for releasing the connecting rod from engagement therewith, a swinging connecting rod hanging loosely from the first plunger upon one side of the rock shaft, a swinging connecting rod hanging freely from the second plunger on the same side of the rock shaft, the said swinging connecting rods being formed with shoulders, and normally hanging loosely against the shaft and arms projecting from the rock shaft, said arms engaging the swinging connecting rods to move them away from the shaft and drop under the shoulders thereof upon the initial movement of the shaft the first plunger being permitted to remain in engagement with the connecting rod when the rock shaft is moved in one direction to admit of the two plungers being drawn toward each other by the action of the cams, while upon the return movement of the rock shaft the first plunger is released from the connecting rod and the arms projecting from the rock shaft engage the shoulders upon the swinging connecting rods so as to raise the first plunger above the press chamber and elevate the second plunger to the top of the press chamber.

8. A brick machine including a press chamber, a plunger mounted above the press chamber and adapted to enter the same, a second plunger slidably mounted within the press chamber and forming a movable bottom for the same, a rock shaft arranged under the press chamber and formed with a pair of oppositely disposed cams, an extensible connecting rod between one of the cams and the second plunger, a connecting rod engaging the opposite cam and also detachably engaging the first plunger whereby the two plungers can be drawn together by the action of the cams when the rock shaft is turned in one direction, means for releasing the second connecting rod from engagement with the first plunger, a swinging connecting rod hanging loosely from the first plunger on one side of the rock shaft, a swinging connecting rod also hanging loosely from the second plunger on the same side of the rock shaft, the said swinging connecting rods being formed with shoulders, and normally hanging loosely against the shaft arms projecting from the rock shaft and engaging the said connecting rods to swing them away from the shaft and drop under the shoulders thereof upon the initial movement of the shaft, the said arms being adapted to engage the said shoulders upon the return movement of the rock shaft to raise the first plunger above the press chamber and elevate the second plunger to the top of the press chamber, and means for automatically locking the first plunger in a raised position.

9. In a brick machine, the combination of a press chamber, a plunger mounted above the press chamber and adapted to enter the same, a second plunger slidably mounted within the press chamber and forming a movable bottom for the same, a rock shaft arranged under the press chamber and formed with oppositely disposed cams, extensible connecting rods between one of the cams and the second plunger, a connecting rod engaging the opposite cam and also engaging the first plunger whereby the two plungers can be drawn toward each other when the rock shaft is turned in one direction, a swinging connecting rod hanging loosely from the first plunger upon one side of the rock shaft, a second swinging connecting rod hanging loosely from the second plunger on the same side of the rock shaft, a third swinging connecting rod hanging loosely from the second plunger on the opposite side of the rock shaft, the said swinging connecting rods being formed with shoulders, and arms projecting from the rock shaft, the said arms engaging the shoulders of the first and second swinging connecting rods during the first half of the return movement of the rock shaft to raise the first plunger above the press chamber and elevate the second plunger to the top of the press chamber, one of the said arms engaging the shoulder of the third swinging connecting rod during the second half of the return movement of the rock shaft to permit of an easy return of the second plunger to normal position.

10. A brick machine including a press chamber, a plunger mounted above the press chamber and adapted to enter the same, a second plunger slidably mounted within the press chamber and forming a movable bottom for the same, a rock shaft journaled under the press chamber and formed with oppositely disposed cams, an extensible connecting rod between one of the cams and the second plunger, a connecting rod engaging the opposite cam and also detachably engaging the first plunger whereby the two plungers are drawn toward each other by the action of the cams when the rock shaft is turned in one direction, means for releasing the connecting rod from engagement with the first plunger previous to the return movement of the rock shaft, a swinging connecting rod hanging loosely from the first plunger upon one side of the rock shaft, a second swinging connecting rod hanging loosely from the second plunger on the same side of the rock shaft, a third swinging connecting rod hanging loosely from the second plunger on the opposite side of the rock shaft, the said connecting rods being formed with shoulders, a pair of arms projecting from the rock shaft and adapted to engage the shoulders of the first two swinging connecting rods during the first half of the return movement of the rock shaft to raise the first plunger above the press chamber and elevate the second plunger to the top of the press chamber, automatic means for locking the first plunger in a raised position, and another arm projecting from the rock shaft for engaging the shoulder of the third swinging connecting rod during the second half of the return movement of the rock shaft to permit of an easy return of the second plunger to normal position.

11. In a brick machine, a supporting frame-work, a press-chamber supported by the frame-work, the bottom of the press-chamber being movable upward therein, a plunger mounted in the frame-work above the press-chamber and adapted to enter said press-chamber, a shaft journaled in the frame-work below the press-chamber, an operative connection whereby revolution of the shaft in an initial direction draws the plunger downward in the press-chamber, means for disconnecting said operative connection after drawing the plunger downward, a second operative connection whereby revolution of the shaft in said initial direction moves the bottom of the press-chamber upward, said second operative connection being telescopic, a connecting-rod pivoted to the plunger and tending to lie in contact with the shaft, said connecting-rod having a shoulder, an arm on the shaft adapted to swing said connecting-rod from said shaft and drop under said shoulder during said initial revolution, a second connecting-rod pivoted to said bottom and tending to lie in contact with the shaft, said second connecting-rod having a shoulder, a second arm on the shaft adapted to swing said second connecting-rod from said shaft and drop under said shoulder during said initial revolution, said shaft being adapted to be revolved in opposite or return direction after disconnection of said first-named operative connection, to cause the first-named arm to lift said first-named connecting-rod and raise the plunger clear of the press-chamber, the second arm of said shaft being adapted to simultaneously lift said second connecting-rod to raise said bottom up flush with the top surface of the press-chamber.

12. In a brick machine, a supporting frame-work, a press-chamber supported by the frame-work, the bottom of the press-chamber being movable upward therein, a plunger mounted in the frame-work above the press-chamber and adapted to enter said press-chamber, a shaft journaled in the frame-work below the press-chamber, an eccentric on the shaft, a connecting-rod having its lower end embracing said eccentric and its upper end adapted to releasably engage the plunger to draw said plunger downward, said connecting-rod being of such length that when the plunger is engaged thereby said plunger has commenced its entrance into the press-chamber, means carried by the plunger for releasing the engagement of said plunger and said connecting-rod, a pulley mounted in the frame-work above the plunger, a cord connecting said plunger and pulley, means for raising the plunger upward out of reach of the connecting-rod and clear of the press-chamber, means causing the pulley to wind up the cord as the plunger is raised, means for locking the pulley to support said plunger in its raised position, a second eccentric on the shaft set diametrically opposite the first-named eccentric, a second connecting-rod having its lower end embracing said second eccentric and its upper end permanently engaging the bottom of the press-chamber whereby revolution of said shaft in initial direction will force a downward pressing movement of the plunger and a simultaneous upward pressing movement of the bottom, said second connecting-rod being telescopic whereby it may allow upward movement of said bottom independent of said shaft, a third connecting-rod pivoted to the plunger and tending to lie in contact with the shaft, said third connecting-rod having a shoulder, an arm on the shaft adapted to swing said third connecting-rod from said shaft and drop under said shoulder during said initial revolution, a fourth connecting-rod pivoted to the bottom of the press-chamber and tending to lie in contact with the shaft, said fourth connecting-rod having a shoulder, a second arm on the shaft adapted to swing said fourth connecting-rod from said shaft and drop under said shoulder during said initial revolution, said shaft being adapted to be revolved in opposite or return direction after its initial revolution and after release of engagement of the first-named connecting-rod and the plunger, to cause the first-named arm to lift said third connecting-rod and raise said plunger clear of the press-chamber, while said second arm of said shaft is adapted to simultaneously lift said fourth connecting-rod to raise said bottom up flush with the top surface of the press-chamber.

Witness my hand this 21 day of July, 1909.

JOHN F. SHECKLER.

Witnesses:
 BESS WILLS,
 A. M. RISHEL.

---

Copies of this patent may be obtained for five cents each, by addressing the "Commissioner of Patents, Washington, D. C."